March 11, 1969     W. E. TRAGERT     3,432,349
ELECTRIC STORAGE CELL
Original Filed Jan. 4, 1965
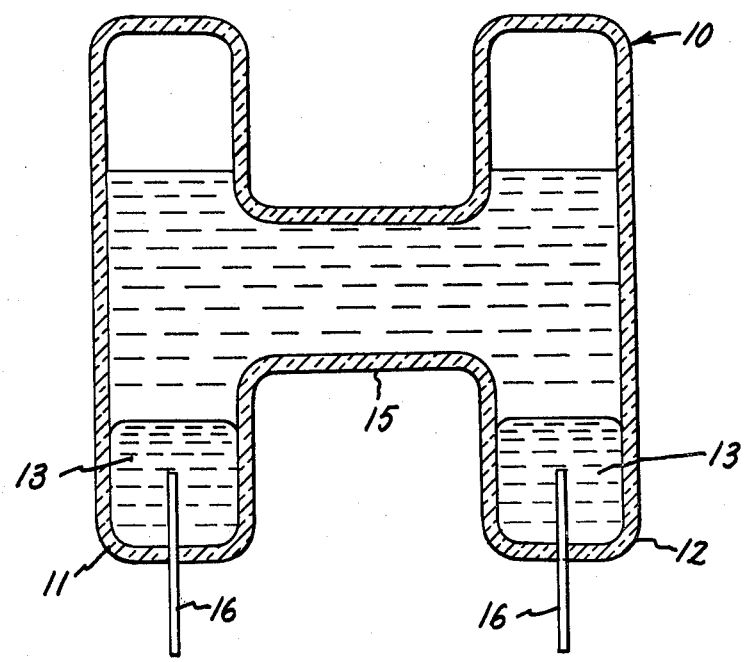
Inventor:
William E. Tragert,
by Richard A. Speer
His Attorney.

United States Patent Office 3,432,349
Patented Mar. 11, 1969

3,432,349
ELECTRIC STORAGE CELL
William E. Tragert, Chagrin Falls, Ohio, assignor to General Electric Company, a corporation of New York
Continuation-in-part of application Ser. No. 422,891, Jan. 4, 1965. This application Nov. 20, 1967, Ser. No. 689,223
U.S. Cl. 136—6    9 Claims
Int. Cl. H01m 11/00

ABSTRACT OF THE DISCLOSURE

An electric storage cell is disclosed having an anode and cathode composed of pools of mercury, a non-aqueous liquid electrolyte solvent in contact with the upper surfaces of the mercury pools and an ionizable compound of a metal selected from the group consisting of aluminum, lithium, sodium, magnesium and potassium in combination with a halogen or a cyano ion. Upon charging, the metal ions migrate to the cathode to form metal amalgams and the halogen or cyano ions migrate to the anode to form mercury halides or mercury cyanide. Upon discharge, the amalgams and the mercury compounds are decomposed, returning the respective ions to the electrolyte.

---

This application is a continuation of application Ser. No. 422,891 entitled "Electric Storage Cell" filed Jan. 4, 1965, now abandoned, in the name of the present inventor and assigned to the present assignee.

This invention relates to electric storage cells and more particularly to such cells having high current density storage capabilities.

The technological demand for an improved storage battery has been voiced often and includes the requirements that the device be inexpensive, spill-proof, light weight, rugged and have high density storage capabilities. The attainment of all these objectives in a single device has eluded prior developers although the achievement of one or more of the objectives has often been possible. Most batteries, other than the dry type, make use of water which, unfortunately, imposes a fundamental limitation on the operation of high energy batteries which involve the more electropositive metals.

It is an object of the present invention to provide a novel electric storage cell which utilizes a non-aqueous solvent electrolyte and possesses construction and performance capabilities markedly superior to those present in prior art devices. It is an additional object of this invention to provide a storage cell which utilizes liquid metal cathodes and anodes and which can be recycled many times without degeneration of the component materials.

Other objects and advantages of this invention will be in part obvious and in part explained by reference to the accompanying specification and drawings.

In the drawings:
FIG. 1 is a schematic side elevation of a storage cell produced according to this invention.

Generally, the cell of this invention comprises a body or container portion which has separate anode and cathode portions, these portions being capable of holding quantities of mercury which serve as the electrical contacts between the dielectric solution and the electrical leads which enable the cell to be connected to an external electric circuit. The mercury contained in the anode and cathode portions is maintained in the form of two separate quantities so that contact between them, other than through the non-aqueous electrolyte solution, cannot occur. The non-aqueous electrolyte solution contains a dissolved ionizable substance.

Referring to the drawings, the cell of this invention comprises a container 10, which is capable of holding liquids and which has separate anode and cathode portions 11 and 12, respectively. Within the anode and cathode portions of the container is a quantity of mercury 13, this mercury being separated into the two distinct portions by means of the intermediate raised separating web 15 of container 10. Obviously, this construction is not the only one which would be suitable to maintaining the quantity of mercury in two separate portions. Other constructions will readily suggest themselves to those skilled in the art. Electrically conductive means, here shown as short wires 16, contact the mercury 13 within the anode and cathode portions of the container and extend to the exterior of the container 10 for connection to an appropriate electrical circuit (not shown).

Also present within a container 10 is a quantity of non-aqueous electrolyte solvent which advantageously has a dielectric coefficient of at least 10 (lower coefficients are suitable in some situations) and which is in contact with the quantities of mercury 13 present in electrode portions 11 and 12. The particular electrolyte solvent chosen may be one of several different types depending upon the ionizable compound which is to be dissolved in it. Materials suitable as a non-aqueous electrolyte solvent should: (1) have a reasonably large dielectric constant ($D \geq 10$); (2) be liquid between −60 to 150° C.; (3) have low viscosity with small temperature coefficient; (4) possess chemical compatibility with the other materials; (5) possess electrochemical stability, and (6) have good thermal stability. It has been found that useful solvents, for example, are acetonitrile, dimethyl formamide, ethylenediamine, pyridine, dimethyl sulfoxide, butyl phosphate and propylene carbonate.

The materials dissolved in the non-aqueous electrolyte, i.e. solute, should have relatively small temperature coefficient of resistivity. In this connection, it has been found that ionizable compounds of the alkali or alkaline earth metals are extremely effective in the construction of the storage cells of this invention. More specifically, the halides of the metals lithium, aluminum, sodium, magnesium and potassium are especially effective.

Considering a cell constructed according to the present invention, a simple pyrex H-cell of the type shown generally in FIG. 1 was constructed and about 30 cc. of mercury placed in the portions or arms 11 and 12. Over the mercury electrodes was added approximately 50 cc. of ethylenediamine (EDA). The EDA had 10 grams of sodium iodide and 3 grams of sodium cyanide dissolved in it. The space above the EDA was filled with argon so that there was no opening of the interior of the cell to the outside atmosphere. Platinum conductor wires corresponding to leads 16 in the drawings were used and the solution then electrolyzed at about 8 volts, 50 milliamperes to cause cathodic deposition of sodium into one mercury electrode and anodic discharge of iodine and cyanide at the other mercury electrode. The sodium forms an amalgam at the cathode, while the anions form the appropriate mercury salts at the anode. The charging reactions thus may be written:

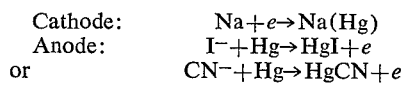

The preceding charging operation exhibited no inefficiency since there was no gas evolution at the electrodes. By placing the cell within an external resistive circuit, the cell was discharged at 1 volt, 5 milliamperes. An open circuit voltage of approximately 1.7 volts was repeatedly obtained for the charged cell and this value fell to about 1.5 volts in the nearly discharged condition. The principal component of internal resistance appeared to be the ohmic resistance of the solution. Decreasing the electrode spacing by raising the mercury level has a nearly linear effect in lowering the resistance. The discharge may be expressed as:

Cathode: $HgI + e \rightarrow Hg + I^-$ (solv.)
or $HgCN + e \rightarrow Hg + CN^-$ (solv.)
Anode: $Na(Hg) \rightarrow Na^+ + e$ The cell just described has been charge-cycled many times with no apparent ill effects and without generation of gas during either part of the cycle. This fact renders it possible to completely seal the cell and thereby eliminate the problem of electrolyte spillage which is common to other liquid storage cells. This feature also eliminates the necessity for replenishing solvent lost through accidental spillage. The choice of a non-aqueous electrolyte solvent makes it possible to utilize very active metals such as sodium, potassium and lithium as energy storage media. Ethylenediamine was chosen for use in the cell described above because of its relatively large solvent capacities, low vapor pressure and commercial availability, although the other solvents mentioned earlier could also be used depending upon the attending circumstances. Mercury electrodes were selected to permit ready charge and discharge of sodium on the one end of the cell and to provide anion storage in compounds having low heats of formation on the other. Another pronounced benefit derived from the use of Hg electrodes resides in its ability to form a stable amalgam with the alkali metals deposited at the working anode during charging of the cell. Such stability precludes the reaction of the alkali metal in its reduced form with several of the electrolyte solvents, viz. acetonitrile, dimethyl formamide, ethylenediamine, etc. Such reaction normally occurs between the elemental alkali metals and these solvents causing their degradation and ultimate unsuitability for the purposes intended.

Although the present invention has been described in connection with preferred embodiments, it is to be understood that modifications and variations may be restored to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An electric storage cell having high current density storage capability comprising a container suitable for holding liquids and having separate anode and cathode portions, a pool of mercury contained within each of said anode and cathode portions of said container, a non-aqueous liquid electrolyte solvent within said container having direct contact with the surfaces of said pools of mercury and providing an electrically conductive path therebetween, an ionizable compound of a metal selected from the group consisting of aluminum, lithium, sodium, magnesium and potassium dissolved in said electrolyte solvent, and electrically conductive means in continuous electrical contact with said pools of mercury and extending to the exterior of said container.

2. An electric storage cell as defined in claim 1 wherein said ionizable metal compound is a halide.

3. An electric storage cell as defined in claim 1 wherein said ionizable compound is sodium cyanide.

4. An electric storage cell as defined in claim 1 wherein said ionizable compound is sodium iodide.

5. An electric storage cell as defined in claim 1 wherein said ionizable compound is potassium cyanide.

6. An electric storage cell as defined in claim 1 wherein said ionizable compound is potassium iodide.

7. An electric storage cell as defined in claim 1 wherein said non-aqueous dielectric is ethylenediamine.

8. An electric storage cell as defined in claim 1 wherein said electrolyte solvent has a dielectric coefficient of at least 10.

9. An electric storage cell as defined in claim 1 wherein said pool of mercury in said anode portion comprises an amalgam of a metal dissociated from said ionizable compound and said pool of mercury in said cathode portion comprises a compound selected from the group consisting of mercury halide, mercury cyanides and mixtures thereof.

References Cited

UNITED STATES PATENTS

| | | | |
|---|---|---|---|
| 1,599,483 | 9/1926 | Parker | 204—195 |
| 3,084,030 | 4/1963 | Ballou et al. | 204—195 XR |

OTHER REFERENCES

Lingane, Electroanalytic Chemistry, second edition, 1958, pp. 111–113, 235 and 238, Scientific Library QD 553 L5e.

WINSTON A. DOUGLAS, *Primary Examiner.*

A. SKAPARS, *Assistant Examiner.*

U.S. Cl. X.R.

136—100